United States Patent [19]

Hamano et al.

[11] Patent Number: 4,838,124
[45] Date of Patent: Jun. 13, 1989

[54] SYSTEM FOR INTEGRALLY CONTROLLING AUTOMATIC TRANSMISSION AND ENGINE

[75] Inventors: Yukio Hamano, Kobe; Yuji Kashihara, Toyota; Keita Sakurai, Toyota; Hideki Yasue, Toyota; Kagenori Fukumura, Toyota, all of Japan

[73] Assignee: Toyota Jidosha Kabushiki Kaisha, Aichi, Japan

[21] Appl. No.: 64,614

[22] Filed: Jun. 22, 1987

[30] Foreign Application Priority Data

Jun. 30, 1986 [JP] Japan .................. 61-153606
Aug. 8, 1986 [JP] Japan .................. 61-186494

[51] Int. Cl.⁴ .......................... B60K 41/08
[52] U.S. Cl. .......................... 74/866; 74/857
[58] Field of Search .......... 74/843, 857, 866, 872

[56] References Cited

U.S. PATENT DOCUMENTS

| | | |
|---|---|---|
| 4,208,929 | 6/1980 | Heino et al. |
| 4,266,447 | 5/1981 | Heess et al. |
| 4,370,903 | 2/1983 | Stroh et al. |
| 4,403,527 | 9/1983 | Hohl et al. |
| 4,506,564 | 3/1985 | Coutant .................. 74/869 |
| 4,543,934 | 10/1985 | Morita et al. |
| 4,635,508 | 1/1987 | Tatsumi .................. 74/861 X |
| 4,716,788 | 1/1988 | Kita .................. 74/872 X |

FOREIGN PATENT DOCUMENTS

| | | |
|---|---|---|
| 0227001 | 12/1984 | European Pat. Off. |
| 0130811 | 1/1985 | European Pat. Off. |
| 55-69738 | 5/1980 | Japan . |
| 2042658 | 9/1980 | United Kingdom . |
| 2156017 | 10/1985 | United Kingdom . |

Primary Examiner—David A. Scherbel
Assistant Examiner—Creighton Smith
Attorney, Agent, or Firm—Oliff & Berridge

[57] ABSTRACT

In a system for integrally controlling an automatic transmission and an engine wherein engine torque is changed during shifting, it is detected whether or not various communication means provided for carrying out the engine torque change is in a failed state. If so, a shift parameter or parameters in the automatic transmission, such as a shift point and engagement oil pressure, are changed in a direction for securing the durability of frictionally engaging devices. When the shift point is changed, a measured value of factors for determining the shift point is corrected to substantially lower the shift point. With this arrangement, computer capacity can be decreased.

14 Claims, 19 Drawing Sheets (A)

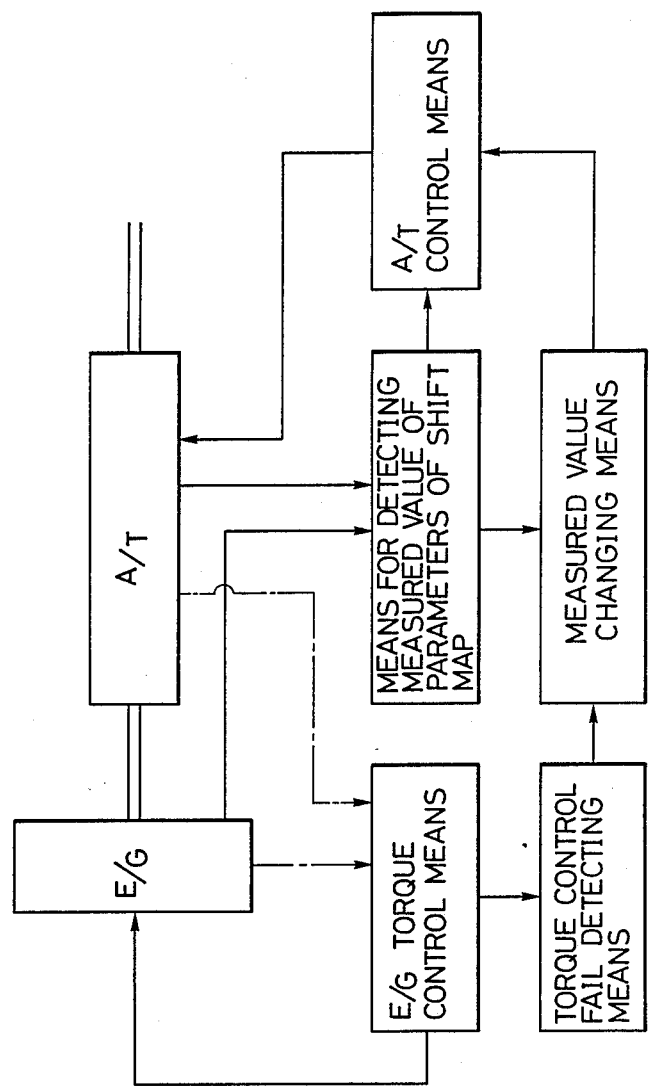

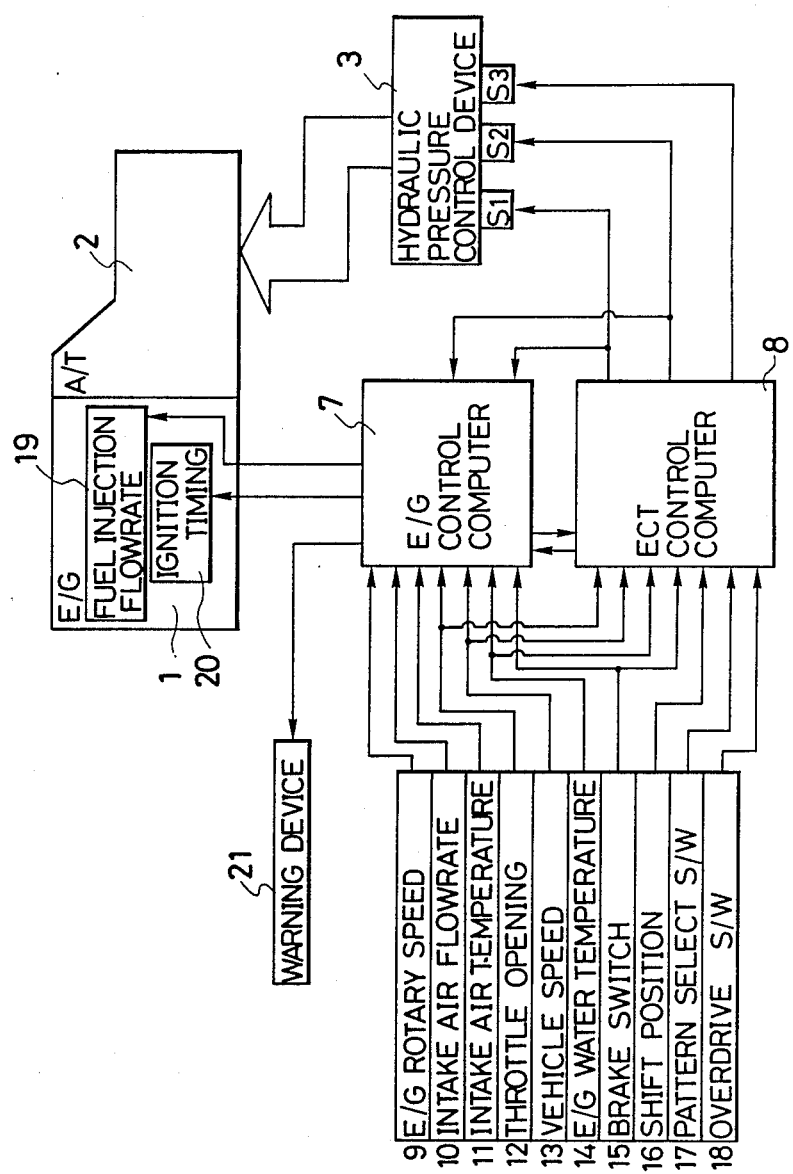

| SHIFT POSITION | WORKING ELEMENT GEAR | SOLENOID S1 | SOLENOID S2 | C0 | C1 | C2 | B0 | B1 | B2 | B3 |
|---|---|---|---|---|---|---|---|---|---|---|
| P | PARK | × | × | ○ | | | | | | |
| R | REV | × | × | ○ | | | | | | ○ |
| N | NEU | × | × | ○ | | | | | | | |
| Ⓓ | 1st | ○ | × | ○ | ○ | | | | | |
| | 2nd | ○ | ○ | ○ | ○ | | | | ○ | |
| | 3rd | × | ○ | ○ | ○ | ○ | | | ○ | |
| | OD | × | × | | ○ | ○ | ○ | | ○ | |
| Ⓢ | 1st | ○ | × | ○ | ○ | | | | | |
| | 2nd | ○ | ○ | ○ | ○ | | | ○ | ○ | |
| | 3rd | × | ○ | ○ | ○ | ○ | | | ○ | |
| L | 1st | ○ | × | ○ | ○ | | | | | ○ |
| | 2nd | ○ | ○ | ○ | ○ | | | ○ | ○ | |

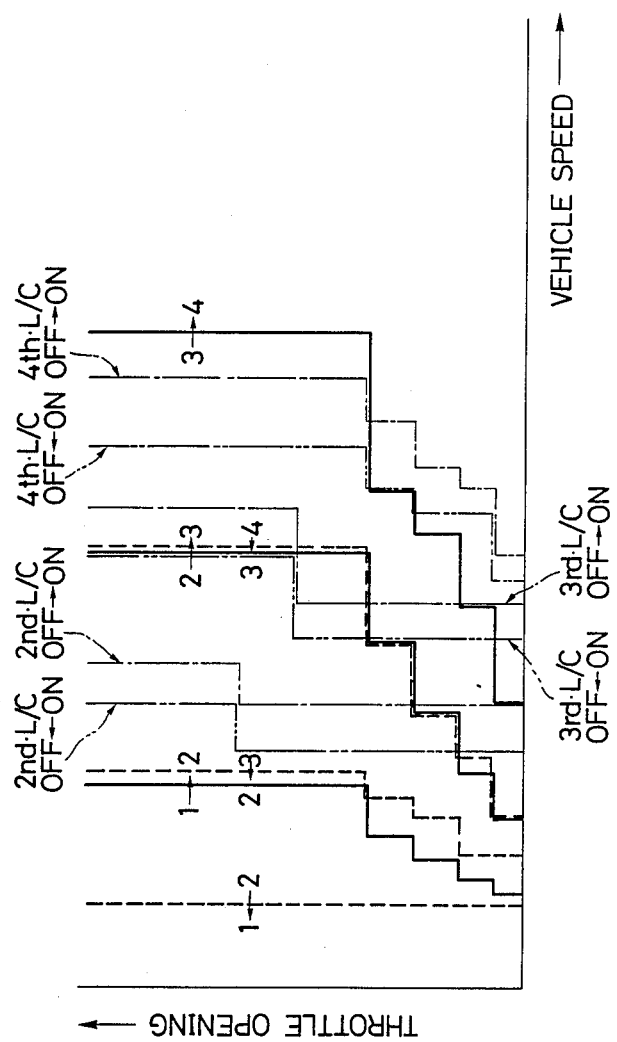

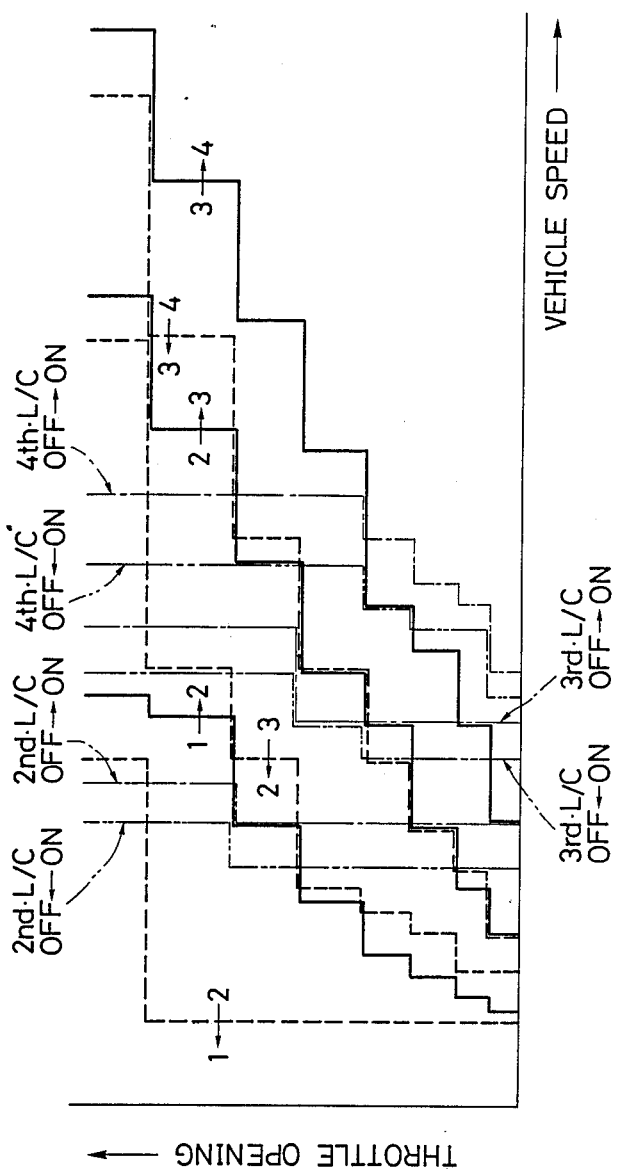

FIG.15

○: ON (ENERGIZED)  
×: OFF (UNENERGIZED)  
(↑) ARROW MARKS INDICATE FAILSAFE OF OPERATION

| E/G TORQUE CHANGE VALUE SIGNAL | ESA LINES DURING NORMAL TIME | | | ESA LINES DURING FAILED TIME | | | | | | | | |
|---|---|---|---|---|---|---|---|---|---|---|---|---|
| | ESA1 | ESA2 | ESA3 | ESA1 FAIL | | | ESA2 FAIL | | | ESA3 FAIL | | |
| | | | | CHANGE VALUE SIGNAL | ESA2 CONT-ROLLED | ESA3 CONT-ROLLED | CHANGE VALUE SIGNAL | ESA1 CONT-ROLLED | ESA3 CONT-ROLLED | CHANGE VALUE SIGNAL | ESA1 CONT-ROLLED | ESA2 CONT-ROLLED |
| $d_0$ | × | × | × | $d_0$ | × | × | $d_0$ | × | × | $d_0$ | × | × |
| $d_1$ | × | × | ○ | $d_1$ | × | ○ | $d_1$ | × | ○ | $d_0 \to d_2$ | × | ×→○ |
| $d_2$ | × | ○ | × | $d_2$ | ○ | × | $d_0 \to d_3$ | ×→○ | × | $d_2$ | × | ○ |
| $d_3$ | ○ | × | × | $d_0 \to d_4$ | ×→○ | ○ | $d_3$ | ○ | ○ | $d_3$ | ○ | × |
| $d_4$ | × | ○ | ○ | $d_4$ | ○ | ○ | $d_1 \to d_5$ | ×→○ | ○ | $d_2 \to d_6$ | ×→○ | ○ |
| $d_5$ | ○ | × | ○ | $d_1 \to d_4$ | ×→○ | ○ | $d_5$ | ○ | ○ | $d_3 \to d_6$ | ○ | ×→○ |
| $d_6$ | ○ | ○ | × | $d_2 \to d_4$ | ○ | ×→○ | $d_3 \to d_5$ | ○ | ×→○ | $d_6$ | ○ | ○ |
| $d_7$ | ○ | ○ | ○ | $d_4$ | ○ | ○ | $d_5$ | ○ | ○ | $d_6$ | ○ | ○ |

FIG.16

O: ON (ENERGIZED)
×: OFF (UNENERGIZED)

(↓) ARROW MARKS INDICATE FAILSAFE OF OPERATION

| E/G TORQUE CHANGE VALUE SIGNAL | ESA LINES DURING NORMAL TIME | | | ESA LINES DURING FAILED TIME | | | | | | | |
|---|---|---|---|---|---|---|---|---|---|---|---|
| | ESA1 | ESA2 | ESA3 | ESA1 FAIL | | ESA2 FAIL | | ESA3 FAIL | | ESA1 ESA2 FAIL | ESA1 ESA2 ESA3 FAIL |
| | | | | CHANGE VALUE SIGNAL | ESA2 ESA3 CONT-ROLLED | CHANGE VALUE SIGNAL | ESA1 ESA3 CONT-ROLLED | CHANGE VALUE SIGNAL | ESA1 ESA2 CONT-ROLLED | CHANGE VALUE SIGNAL | |
| $d_0$ | × | × | × | $d_0$ | × | $d_0$ | × | $d_0$ | × | $d_0$ | UNCONT-ROLLABLE |
| $d_1$ | × | × | O | $d_1$ | O | $d_0{\to}d_2$ | ×${\to}$O | $d_0{\to}d_3$ | ×${\to}$O | $d_0$ | ← |
| $d_2$ | × | O | × | $d_0{\to}d_1$ | ×${\to}$O | $d_2$ | O | $d_0{\to}d_3$ | ×${\to}$O | $d_0$ | ← |
| $d_3$ | O | × | × | $d_0{\to}d_1$ | ×${\to}$O | $d_0{\to}d_2$ | ×${\to}$O | $d_3$ | O | $d_0$ | ← |
| $d_4$ | × | O | O | $d_1$ | O | $d_2$ | O | $d_0{\to}d_3$ | ×${\to}$O | $d_0{\to}d_3$ | ← |
| $d_5$ | O | × | O | $d_0{\to}d_1$ | ×${\to}$O | $d_0{\to}d_2$ | ×${\to}$O | $d_3$ | O | $d_3$ | ← |
| $d_6$ | O | O | × | $d_1$ | O | $d_2$ | O | $d_3$ | O | $d_3$ | ← |
| $d_7$ | O | O | O | $d_1$ | O | $d_2$ | O | $d_3$ | O | $d_3$ | ← |

SYSTEM FOR INTEGRALLY CONTROLLING AUTOMATIC TRANSMISSION AND ENGINE

BACKGROUND OF THE INVENTION

This invention relates to improvements in a system for integrally controlling an automatic transmission and an engine.

Automatic transmissions are known to include gear transmission mechanisms, a plurality of frictionally engaging devices, and hydraulic pressure control devices operated to selectively switch the engagements of the frictionally engaging devices, so that any one of plurality of gear stages can be achieved in accordance with a preset shift map.

Furthermore, in an automatic transmission for a vehicle of the type described, various systems are known for integrally controlling an automatic transmission and an engine, wherein engine torque is changed during shifting to obtain satisfactory shift characteristics and durability of the frictionally engaging devices. More specifically, the system for integrally controlling the automatic transmission and the engine of the type described changes the amount of torque transmitted from the engine during shifting and controls the amount of energy absorbed in various members of the automatic transmission or in the frictionally engaging devices so as to complete a shifting within a short period of time under a low shift shock, whereby a satisfactory shift feeling is given to a driver and durability of the frictionally engaging devices is improved.

Now, in constructing the above-described system, when means for controlling the engine, means for controlling the automatic transmission and further control means for determining processing data including the engine torque change timing and engine torque change value are integrally provided in the system, increased capacity of a computer leads to increased cost. In addition it is disadvantageous to mount the system on a vehicle which has a high limitation in storage space.

Furthermore, adoption of the integrally controlling system may be disadvantageous from the viewpoints of all-around properties or common-purpose properties of the aforesaid control means, because there are vehicles which require no engine torque control.

To obviate the above-described disadvantages, there has been proposed a technique wherein the aforesaid control means are provided separately of each other.

However, when the means for controlling the engine and the means for controlling the automatic transmission are formed separately of each other as described above, in order to change the engine torque during shifting, it becomes necessary to provide various inevitable communication means for connecting both control means to each other. Furthermore, the communication means may cause a problem in that these communication means may be disconnected or short-circuited. As a result, an engine torque change control cannot be adequately carried out when the engine torque change control should properly be performed. If the aforesaid situation occurs, then an energy value absorbed in the frictionally engaging devices increases, whereby the durability of these frictionally engaging devices is deteriorated. Furthermore, such a problem also occurs that the shift duration is prolonged, whereby the shifting is not completed within a shockless region of an accumulator, so that shift shocks become high. This is because, on the automatic transmission side, shift tuning data such as oil pressure are preset in expectation of decreasing the engine torque by a predetermined value during the shifting.

SUMMARY OF THE INVENTION

A first aspect of the present invention has been developed to obviate the above-described problems and has as its object the provision of a system for integrally controlling an automatic transmission and an engine, wherein, when an engine control means and an automatic transmission control means are formed separately, even if the various communication means do not operate, the durability of the frictionally engaging devices can be properly maintained.

To achieve the above-described object, the technical gist of which is shown in FIG. 1(A), the first aspect of the present invention contemplates a system for integrally controlling an automatic transmission and an engine, wherein engaged states of the frictionally engaging devices are switched in accordance with a preset shift map, so that gear stages can be automatically switched, and furthermore, an engine torque is changed during shifting to obtain satisfactory shift characteristics. Namely, in the case where the engine control means and the automatic transmission control means are formed separately, and accordingly, the various communication means are provided between both control means for changing an engine torque during shifting, the first aspect of the present invention detects any failure (i.e., the failed states) of these communication means. Further, the shift parameter is changed to the direction of securing the durability of the frictionally engaging devices in accordance with the result of failure detection. As a result, even if trouble occurs in the communication means, the durability of the frictionally engaging devices can be satisfactorily secured.

The parameter to be changed can be, for example, a shift point in the automatic transmission or engagement oil pressure of the frictionally engaging devices in the automatic transmission. When a shift point in the automatic transmission is adopted as the parameter to be changed, the shift point is changed to be slightly lower. If the change is made as described above, then a shifting is carried out while the vehicle speed is low, i.e., an inertia torque of the engine is low, so that the durability of the frictionally engaging devices can be secured. On the other hand, when engagement oil pressure of the frictionally engaging devices in the automatic transmission is adopted as the shift parameter to be changed, the engagement oil pressure is changed to be slightly higher. If the change is made as described above, then a time period during which the frictionally engaging devices slide can be shortened accordingly, and the durability of the frictionally engaging devices can be secured. In either case, the shift duration can be made shorter, so that shift shocks due to incompleteness of the shifting within the shockless region of the accumulator can be avoided.

When the shift point in the automatic transmission is changed to be lower, the power performance is somewhat lowered. However, the fuel consumption rate is improved and the shift characteristics are not deteriorated. When the engagement oil pressure is changed to a higher value, the shift shocks are somewhat increased, however, the power performance is not deteriorated, and the effect of securing the durability of the frictionally engaging devices is relatively high.

In view of the above-described points, when the failure of the aforesaid communication means is detected to be not serious, the shift point in the automatic transmission may be preferably adopted as the shift parameter to be changed, and, when the fail of the communication means is detected to be serious, the engagement oil pressure of the frictionally engaging devices in the automatic transmission may be preferably adopted as the shift parameter to be changed. Incidentally, both the shift point and engagement oil pressure should naturally be made changeable simultaneously. By the way, when the shift point is adopted as the shift parameter, to prepare several types of shift point maps increases computer capacity and costs. In this case, if factors for determining the shift point, i.e., measured values such as the vehicle speed, and engine load are corrected, then the computer may need only a single shift point map, i.e., may need a relatively low capacity. In general, a shift point is determined by the vehicle speed, the engine load (e.g. throttle opening) and the like. In consequence, either one or both of these factors are corrected, so that the shift point can be virtually changed to be slightly lower.

A second aspect of the present invention is based on the above-described point. In FIG. 1(B) shows detecting means for whether or not an engine torque change is in a state of being practically performable, and means for correcting at least one of measured value of the factors for determining the shift point in a direction for changing the shift point to be slightly lower when the engine torque change is not performable, to thereby avoid increased computer capacity and increased costs.

According to the second aspect of the present invention, the aforesaid correction can be easily performed in accordance with a selected position of pattern select switch, so that a change of a shift point can be accordingly performed more accurately. More specifically, vehicles have come into wide use that are provided with two or more shift point maps to select a running pattern (for example, power performance mode and fuel consumption mode). In working the present invention, when a correction value of the parameter, (i.e., a change value of the shift point) is determined in accordance with the position of this running pattern select switch, the running pattern or mode more reflecting the user's intent can be maintained, and furthermore, the shift point can be changed more accurately.

Incidentally, according to the second aspect of the present invention, the cause for changing the shift point to be slightly lower is not limited to a failure in the communication means. The following causes can be listed:

(1) When a trouble occurs in a sensor system relating to determination of the engine torque change timing;

(2) When the temperature of an exhaust system is raised and exceeds a reference value due to increase of so-called afterburn in the case where the lag angle control of ignition timing is adopted as the means for the engine torque change for example; and (3) When there is a possibility of misfires and the like due to practice of the engine torque reducing control.

According to the second aspect of the present invention, whether or not these causes occur, (i.e., the engine torque change is practically performable), is detected. As a consequence, when the engine torque change is not performed, the cause is already clarified. The shift parameter (changing the shift ) can be corrected most properly, if it is corrected in consideration of the cause.

BRIEF DESCRIPTION OF THE DRAWINGS

The above object, features and advantages of the present invention, as well as other objects and advantages thereof, will become more apparent from the following description of the invention, taken into conjunction with the accompanying drawings, wherein reference characters designate the same or similar parts and wherein:

FIG. 2 is a schematic view generally showing one embodiment of the system for integrally controlling an automatic transmission and an engine, to which the present invention is adopted;

FIGS. 13 and 14 are charts showing example of the shift point map during the time failure is detected, respectively;

FIGS. 15 and 16 are charts showing examples of the patterns wherein the failsafe modes are performed, respectively;

DESCRIPTION OF THE PREFERRED EMBODIMENTS

Figure 1:
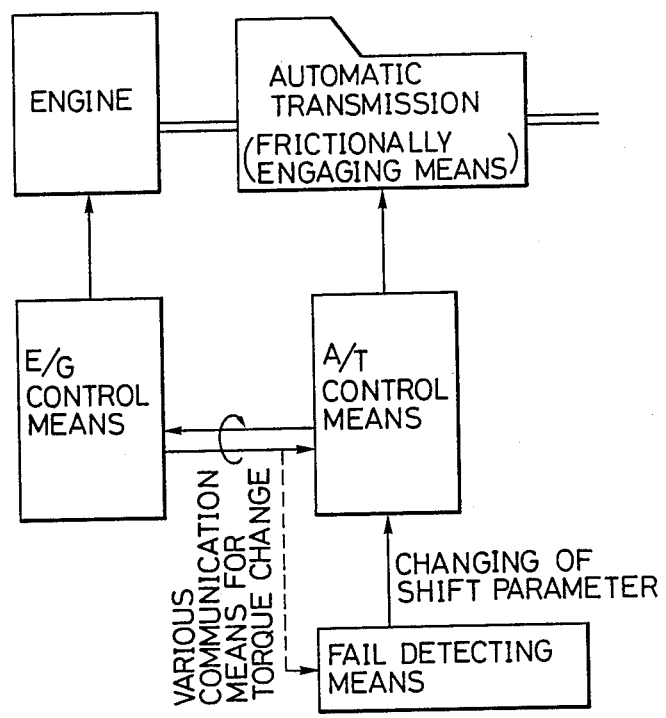
FIG. 1(A) and 1(B) are block diagrams showing the technical illustration of the first and second aspects of the present invention.

The present invention will be described in detail with reference to the accompanying drawings which illustrate preferred embodiments of the present invention. FIG. 2 is a block diagram showing the general arrangement of the system for integrally controlling an automatic transmission and an engine, to which the present invention is applied.

An engine 1 and an automatic transmission 2 are well known in the art. Fuel injection flowrate at an injector 19 and an ignition timing at a distributor 20 are controlled by an engine control computer 7, so that engine output in proportion to throttle opening and engine rotary speed can be obtained. In the automatic transmission (hereinafter referred to as "ECT") 2, electromagnetic valves S1–S4 of hydraulic pressure control device 3 are controlled by an automatic transmission control computer (hereinafter referred to as "ECT control computer") 8, and oil lines in a hydraulic pressure control device 3 are controlled whereby the engagements of frictionally engaging devices are selectively changed, so that a gear stage proportional to vehicle speed and throttle opening can be obtained.

More specifically, the engine control computer 7 receives signals of engine rotary speed from an engine rotary speed sensor (crank angle sensor) 9; intake air flowrate from an air flow meter 10; intake air temperature from an intake air temperature sensor 11; throttle opening from a throttle sensor 12; vehicle speed from an output shaft speed sensor 13; engine water temperature from a water temperature sensor 14; and brake ON signal from a brake switch 15. The engine control computer 7 determines the fuel injection flowrate and the ignition timing in response to the above-mentioned signals. Furthermore, ON-OFF solenoid signals of the electromagnetic valves S1–S2 controlled by the ECT control computer 8 and signals of three engine torque change value lines (ESA lines) are parallelly inputted into engine control computer 7, whereby shift timing of the ECT is recognized.

ECT control computer 8 receives signals from the throttle sensor 12; the vehicle speed sensor 13; the water temperature sensor 14; the brake switch 15, and further, signals of: position of a shift lever from a shift position sensor 16; running selection pattern such as a fuel consumption mode or a power performance mode from a pattern select switch 17; permission of a shift to overdrive from an overdrive switch 18; and the like, whereby the ON-OFF states of electromagnetic valves S1–S4 are controlled, so that a gear stage proportioned to the vehicle speed and the throttle opening can be obtained. Additionally, the electromagnetic valve S3 is used for engaging a lockup clutch and the electromagnetic valve S4 is used for nonacting of cutback as will be described hereunder.

Figures 3, 4:
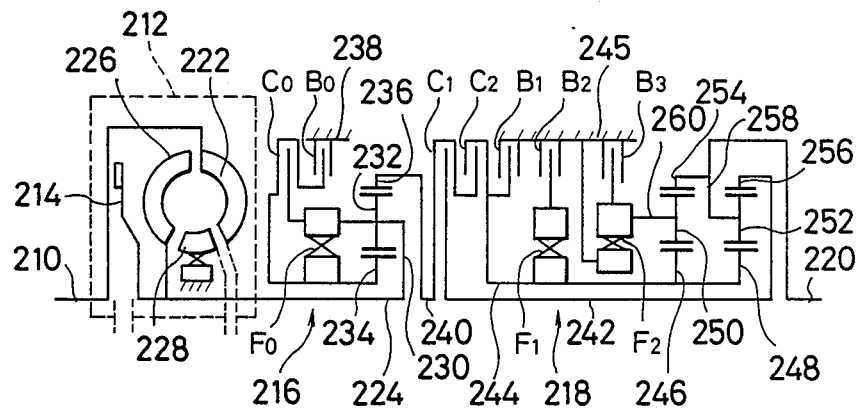
FIG. 3 is a skeleton diagram showing the arrangement of a transmission section of the automatic transmission.
FIG. 4 is a chart showing the engaged states of the respective frictionally engaging devices in the above system.

FIG. 3 is the skeleton diagram showing the transmission section of the ECT.

The driving force inputted into an input shaft 210 is passed through a torque converter 212, or a lockup clutch 214 provided in the torque converter 212, an overdrive mechanism 216, and a planetary gear type transmission device 218 as a gear mechanism of three forward gear stages and one reverse gear stage, and transmitted to an output shaft 220. The torque converter 212 is well known and includes a pump 222 rotatable with the input shaft 210, a turbine 226 fixed to a turbine shaft 224 for transmitting the driving force to the overdrive mechanism 216 and a stator 228 fixed to the torque converter 212 through a one-way clutch. The turbine shaft 224 constitutes an input shaft of the overdrive mechanism 216 and connected to a carrier 230 of the planetary gear unit in the overdrive mechanism 216. A planetary pinion 232 is rotatably supported by the carrier 230 and in mesh with a sun gear 234 and a ring gear 236. A clutch C0 and a one-way clutch F0 are provided between the sun gear 234 and the carrier 230. A brake B0 is provided between the sun gear 234 and a housing 238 of the overdrive mechanism 216. The ring gear 236 of the overdrive mechanism 216 is fixed to an input shaft 240 of the planetary gear type transmission device 218, and a clutch C1 is provided between the input shaft 240 and an intermediate shaft 242. A clutch C2 is provided between the input shaft 240 and a sleeve shaft 244 coupled to the intermediate shaft 242. A brake B1, a brake B2 and a one-way clutch F1 are provided between the sleeve shaft 244 and a housing 245 of the transmission. Sun gears 246 and 248 fixed to the sleeve shaft 244 are brought into mesh with ring gears 254 and 256 through planetary pinions 250 and 252, to thereby form two sets of planetary gear units. One of the ring gears 256 is fixed to the intermediate shaft 242. A carrier 258 rotatably supporting the planetary pinion 252 is connected to an output shaft 220 and the other ring gears 254. A brake B3 and a one-way clutch F2 are respectively provided between a carrier 260 rotatably supporting the other planetary pinion 250 and the transmission housing 245.

The aforesaid clutches C0, C1 and C2 and the aforesaid brakes B0, B1, B2 and B3 as being the frictionally engaging devices are selectively driven by actuators C0y, C1y, C2y and C2y, and B0y, B1y, B2y and B3y, which are operated by the hydraulic control device 3. Specified frictionally engaging devices of the planetary gear type transmission device 218 are braked or engaged with one another, so that gear stages can be switched as shown in FIG. 4. In FIG. 4, marks 0 indicate the actuated positions.

Figure 5:
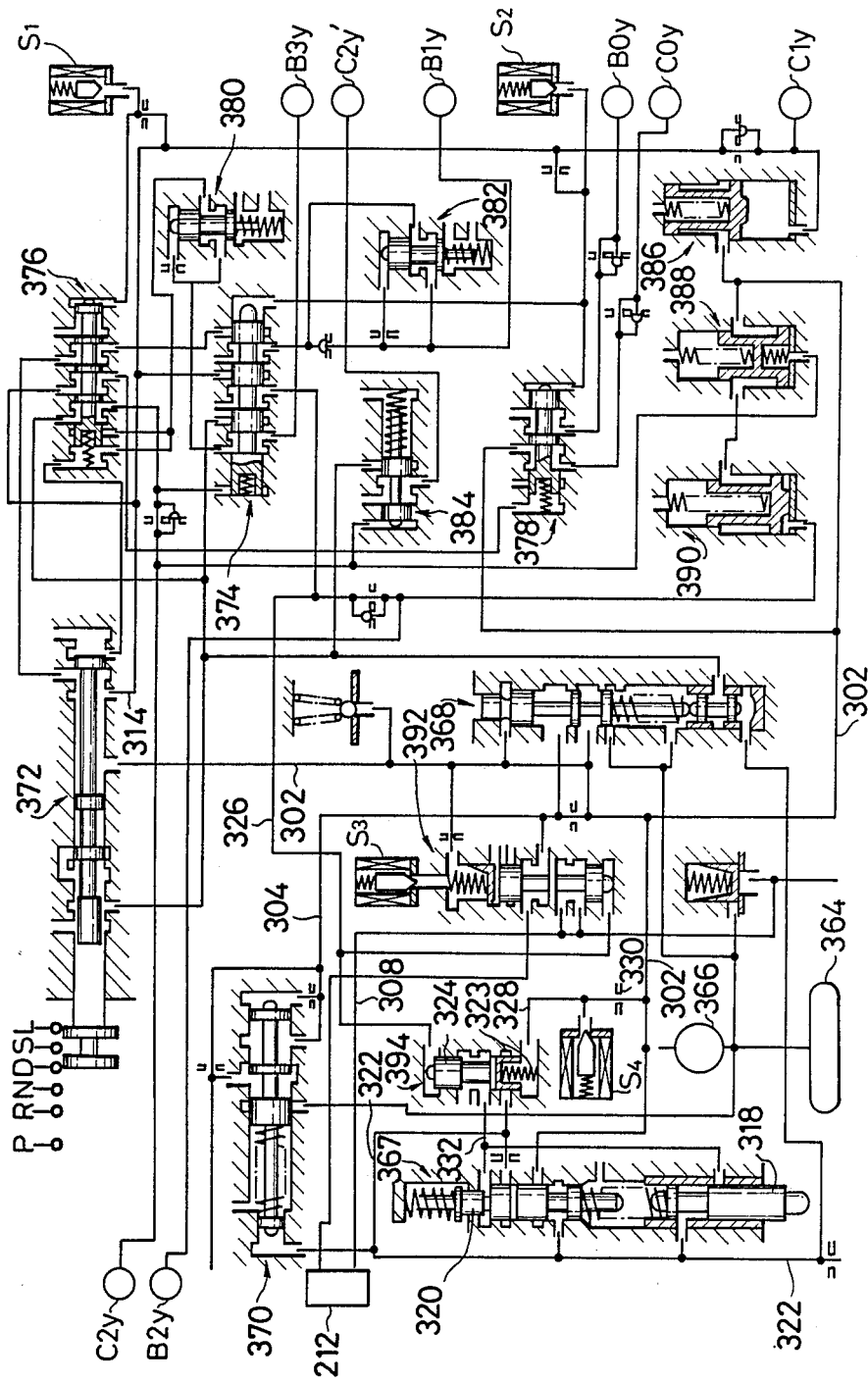
FIG. 5 is a hydraulic circuit diagram showing the arrangement of the hydraulic control devices.

FIG. 5 shows the hydraulic control device 3 in detail.

This hydraulic control device 3 includes: an oil pump 366 for feeding oil in an oil reservoir 364 under pressure; a throttle valve 367; a primary regulator valve 368; a secondary regulator valve 370; a manual control valve 372 operated by a shift lever provided in a driver's seat; a 1-2 shift valve 374; a 2-3 shift valve 376; a 3-4 shift valve 378; a low coast modulator valve 380 for regulating feed of working oil pressure to the actuator B3y; an intermediate coast modulator valve 382 for regulating feed of working oil pressure to the actuator B1y; a reverse clutch sequence valve 384; accumulators 386 and 388 for smoothing engagement between the clutches C1 and C2; an accumulator 390 for smoothing engagement of the brake B2; a lockup control valve 392 for operating the lockup clutch 214; a cutback valve 394 for lowering the line oil pressure in accordance with the increase of the vehicle speed; the electromagnetic valve S1 for controlling the 2-3 shift valve 376, which is operated by a shift control circuit, not shown; the electromagnetic valve S2 for controlling the 1-2 shift valve 374 and the 3-4 shift valve 378; the electromagnetic valve S3 for controlling the lockup control valve 392; the electromagnetic valve S4 for bringing the cutback into non-acting state; oil lines for connecting the valves and the actuators to one another; and the like.

The working oil fed under pressure from the oil pump 366 is regulated to the line oil pressure by the primary regulator valve 368, passed through an oil line 302, and fed to the manual control valve 372 through an oil line 304. The secondary regulator valve 370 regulates torque converter oil pressure and lubricant oil pressure which are fed from the throttle valve 367 in response to a throttle pressure and the line oil pressure.

Figure 6:
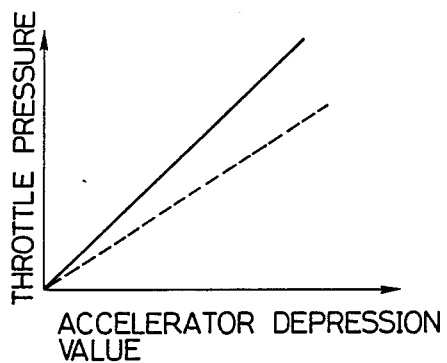
FIG. 6 is a chart showing the relationship between the accelerator opening value and the throttle pressure.
Figure 7:
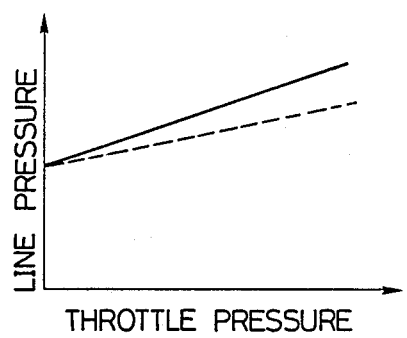
FIG. 7 is a chart showing the relationship between the throttle pressure and line oil pressure.

The throttle valve 367 includes: a first spool 318 movable in accordance with a value of depression of an accelerator pedal; and a second spool 320 receiving a biasing force commensurate to the movement of the first spool 318 through a spring. A second spool 320 is urged toward the first spool 318 through another spring. This throttle valve 367 feeds the throttle pressure substantially in proportion to the value of depression of the accelerator pedal to the primary regulator valve 368 and the secondary regulator valve 370 through an oil line 322, and raises the line oil pressure and the torque converter oil pressure in accordance with the value of depression of the accelerator pedal. More specifically, the throttle pressure outputted from the throttle vlave 367 is raised in accordance with the value of depression of the accelerator pedal as indicated by a solid line in FIG. 6, and the line oil pressure outputted from the primary regulator valve 368 is raised in accordance with the throttle pressure, i.e., the value of depression of the accelerator pedal as indicated by a solid line in FIG. 7.

The cutback valve 394 has a spool 324 urged toward a cutback non-acting position by a spring 323. When the electromagnetic valve S2 is energized to bring the 1-2 shift valve 374 into second gear stage or thereabove, the line oil pressure is caused to act on this spool 324 through an oil line 314, the 1-2 shift valve 374 and an oil line 326, whereby the spool 324 is moved to a cutback acting position in opposition to the spring 323. Furthermore, this cutback valve 394 is connected to an oil line 302 through an oil line 328 and an orifice 330, and the electromagnetic valve S4 is connected to the oil line 328. When the electromagnetic valve S4 is deenergized and valve port thereof is closed, the line oil pressure of the oil line 302 is caused to act on the spool 324, whereby the spool 324 is located at a cutback non-acting position (position shown in FIG. 5). When the electromagnetic valve S4 is energized and valve port thereof is opened, pressure oil in the oil line 328 is discharged and the spool 324 is allowed to move into a cutback acting position.

When the spool 324 is located at the cutback non-acting position, the throttle pressure fed through the oil line 322 is not supplied to the second spool 320 of the throttle valve 367. However, when the spool 324 is located at the cutback acting position, the throttle pressure as being cutback pressure is fed to the second spool 320 through the oil line 332. On the other hand, in the second spool 320 of the throttle valve 367, a pressure receiving surface is formed. When the pressure receiving surface receives the cutback pressure fed from the cutback valve 394 through the oil line 332, a force acts on the side of first spool 318. As a consequence, when the spool 324 of the cutback valve 394 is located at the cutback acting position, the throttle pressure and the line oil pressure are changed to the pressures indicated by broken lines in FIGS. 6 and 7. After all, the cutback valve 394 is constructed such that, in the case of first gear stage, the line oil pressure is raised to hold the high capacity of the frictionally engaging devices such as clutches and brakes, and, in the case of second gear stage or thereabove, the line oil pressure is lowered to avoid unnecessary power loss in the oil pump 364.

Figure 8:
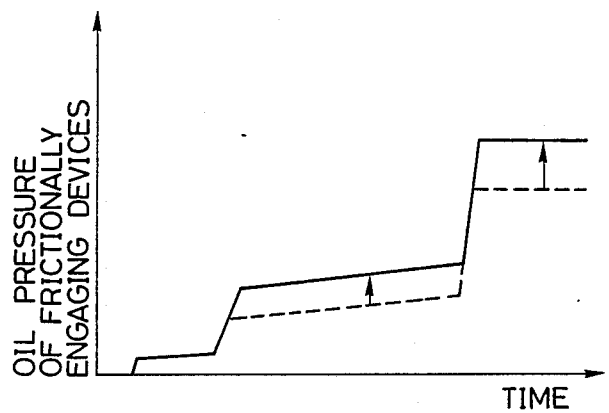
FIG. 8 is a chart showing the state where cutback is performed.

In this embodiment, the electromagnetic valve S4 is truned OFF when communication line trouble is detected to increase the oil line pressure of the frictionally engaging device. Then the cutback valve 394 is forcedly located at the cutback non-acting position, so that the cutback action as described above is not carried out, thereby raising the oil pressure in the frictionally engaging devices (in FIG. 8, from broken line to solid line).

Figure 9:
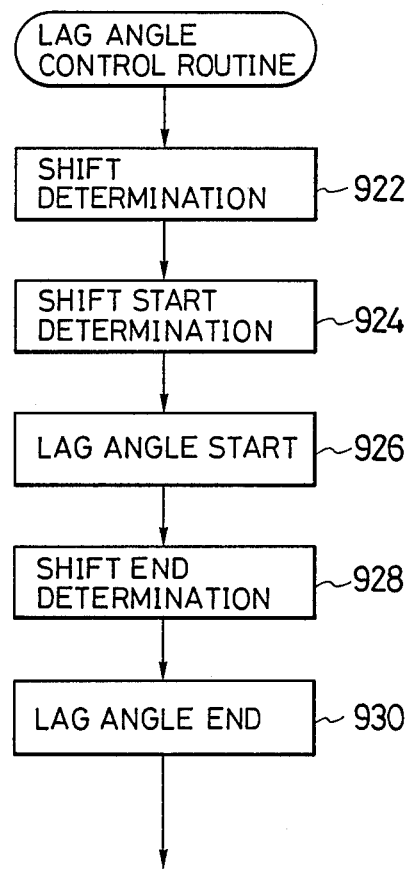
FIG. 9 is a flow chart showing the engine torque change control routine adopted in the system of the above embodiment.

FIG. 9 is a flow chart illustrating the integral control of the engine and the ECT.

In the control routine of the engine control computer 7, an occurrence of shifting is detected from a change in signal of the electromagnetic valves S1–S3 (Step 922), and thereafter, it is detected that a shift has actually started when the engine rotary speed changes (for example, in the case of an upshifting, the engine rotary speed is lowered) (Step 924), the ignition timing is retarded by a lag angle value in accordance with the digital value transmitted from the ECT control computer 8, whereby the engine torque change is carried out (Step 926). In the ECT control computer 8, completion of the shifting is detected when the shifting has progressed and the engine rotary speed Ne is changed up to rotary speed NeA which is obtained by adding a predetermined value (including a negative number) to an engine rotary speed NeB at the time of completion of the shifting, NeB being determined by an output shaft rotary speed and a gear ratio (Step 928). Thereafter, the lag angle control is ended slowly taking a predetermined time, and ignition timing is restored to the normal state (Step 930).

Figure 10:
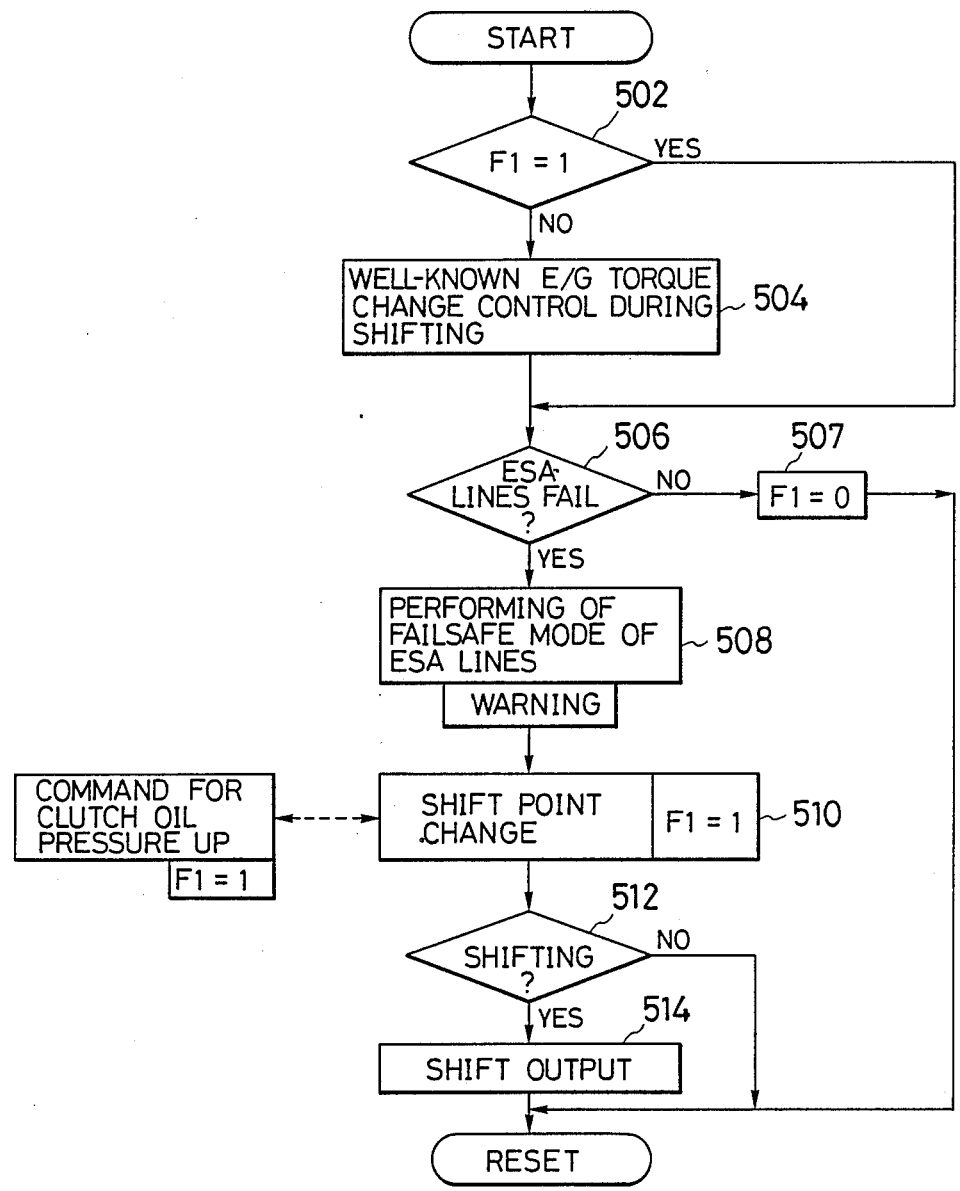
FIGS. 10 and 11 are flow charts showing examples of the control flow used in the above system, respectively.

FIG. 10 shows the control flow in the ECT control computer 8.

Figure 12:
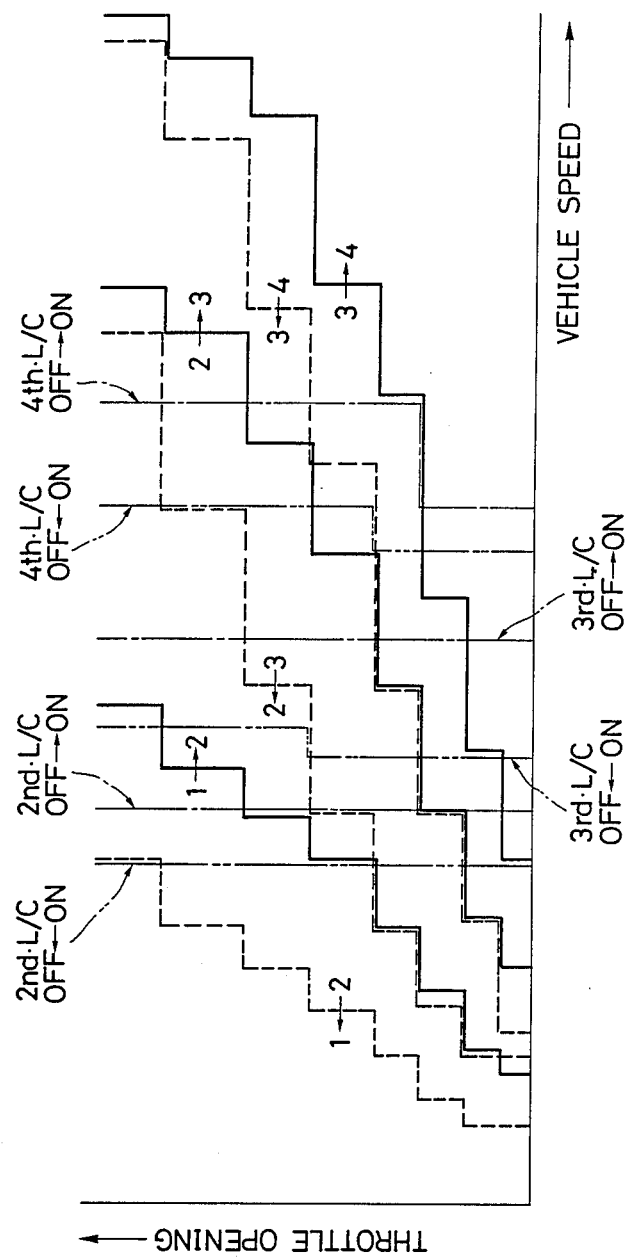
FIG. 12 is a chart showing an example of the shift point map during the normal time.

A flag F1 in Step 502 is a flag determining whether the communication lines (hereinafter referred to as "ESA lines") have failed (i.e., are in a failed state or not), and, when F1 32 1, the ESA lines are in the failed state. In Step 502, when F1=1, i.e., the ESA lines are detected to be in the failed state, and the engine torque control is not carried out in Step 504. In Step 506, whether the ESA lines are short-circuited or disconnected, (i.e., failure or not) is detected. This detection is performed by a well-known method in the electric circuit of the ECT control computer 8. When even one of the ESA lines is short-circuited or disconnected, the failed state is sensed, whereby the routine proceeds to Step 508, where the failsafe mode of ESA lines is performed. More specifically, when even one of the ESA lines is detected to be short-circuited or disconnected, all the other ESA lines are changed such that no engine torque controls are carried out therein. Furthermore, a warning of that is issued to the driver simultaneously. In Step 510, to secure the durability of the frictionally engaging devices, the shift pattern during the normal time (refer to FIG. 12) is changed to the shift pattern during the failed time (refer to FIG. 13). In the shift pattern during the failed time (FIG. 13), the shift point is set fairly lower as compared with the shift point in the shift pattern during the normal time (FIG. 12). In Step 510, the flag F1 is set at 1 simultaneously.

On the other hand, when the ESA lines are determined to be normal in Step 506, the flag F1 is set at 0 in Step 507 and the flow is reset. The reason why the flag F1 is reset to 0 resides in that, even when F1=1, i.e., the failed state is detected in Step 502, if, thereafter, the normal state is restored, then the routine proceeds through Step 504 again in the succeeding flow.

After the shift point is changed in Step 510, a shifting is determined in accordance with the shift point thus changed (Step 512), and a shift output for the shifting is issued (Step 514). As described above, when the shift point is changed, no engine torque control is carried out.

Incidentally, in Step 510, instead of changing the shift point, a command for increasing working oil pressure of the frictionally engaging devices may be outputted and the flag F1 may be set at 1. In this case, as the shift pattern, the shift pattern during the normal time can be used as it is. The means for increasing working oil pressure in the frictionally engaging devices has been already described in detail.

Figure 11:
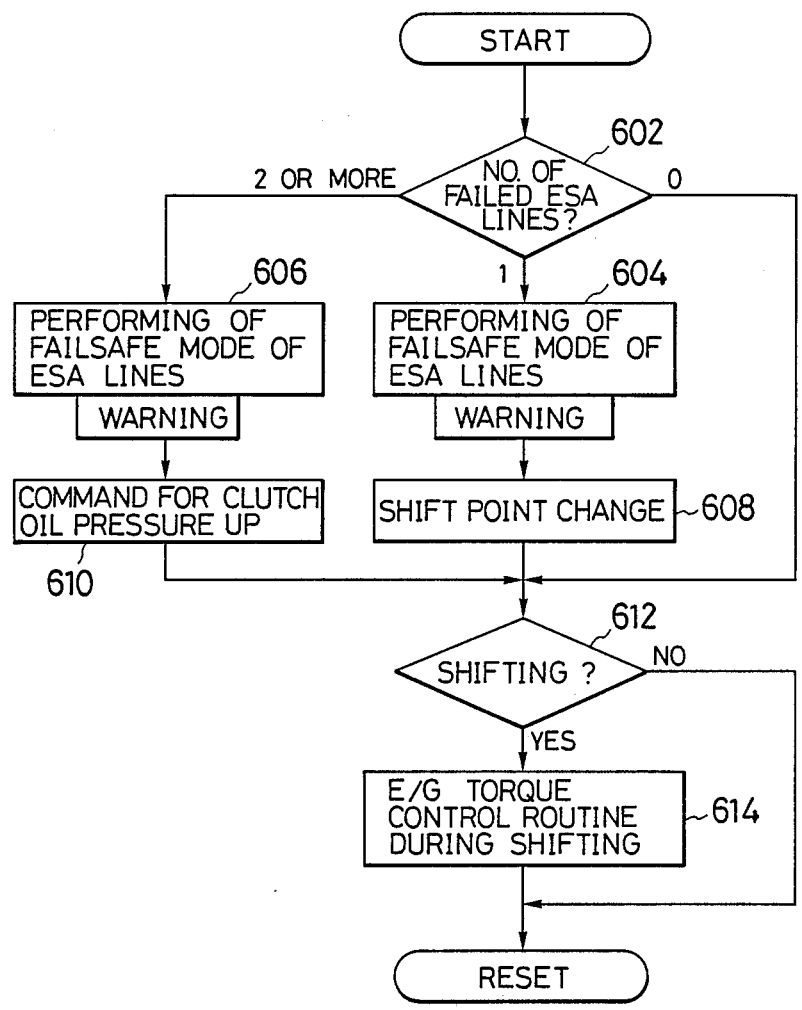

FIG. 11 shows another example of the control flow which operates as follows:

Step 602: It is detected how many ESA lines are disconnected or short-circuited. When no ESA line is in the failed state, it is determined to be normal, and the routine proceeds to Step 612.

When one of the ESA lines is in the failed state, it is determined that, although the ESA line is in the failed state, the engine torque change control can be performed close to the one during the normal time by appropriately controlling the other two ESA lines, and the routine proceeds to Step 604. When two or more of the ESA lines are in the failed state, it is determined that the engine torque change control can hardly be carried out and the routine proceeds to Step 606.

Figure 17:
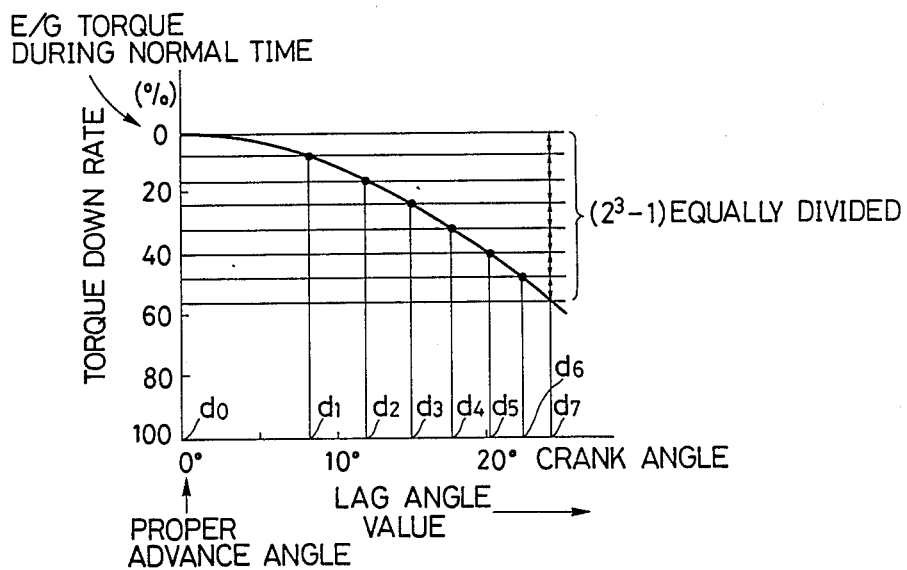
FIG. 17 is a chart showing the relationship between engine torque change values d0–d7 and the lag angle values.

Step 604: When one of the ESA lines is in the failed state, the ECT control computer controls the other two operative ESA lines in accordance with the failsafe mode shown in FIG. 15. As shown in FIG. 17, $d_0-d_7$ indicated in FIG. 15 are values preset corresponding to the lag angle values which are obtained by equally dividing by eight a down value of the engine torque.

Step 608: Since the engine torque change value is set somewhat lower as compared with the one during the normal time, the shift point is changed to be slightly lower in order to decrease the absorbed energy value in the frictionally engaging devices. More specifically, the shift pattern during the normal time as shown in FIG. 12 is changed to the shift pattern as shown in FIG. 14. This shift pattern shown in FIG. 14 is closer to the normal time shift pattern in FIG. 12 than the failed time shift pattern as shown in the above embodiment (refer to FIG. 13), because the torque change is allowed to be performed even to some extent. Accordingly, lowering of the power performance is reduced to the minimum.

Step 606: When two or more ESA lines are in the failed state, a normal line is operated to carry out the failsafe mode. In this case, the engine torque change value may be set at 0, or the engine torque may be changed within a tolerable range as shown in FIG. 16. When the engine torque change value is set at 0, the engine torque change in Step 614 is substantially bypassed. Upon performing the failsafe mode, a warning is outputted.

Step 610: When the engine torque change cannot be carried out or the change value is very small, working oil pressure in the frictionally engaging devices is raised to shorten the shift duration, so that the shifting can be completed within the shockless region of the accumulator. At this time, the shift point need not necessarily be changed, and the power performance equal to the one during the normal time can be secured.

Incidentally, when two of the ESA lines are in the failed state, if the remaining one is used to carry out the engine torque change, then the energy value absorbed in the frictionally engaging devices is decreased as compared with the case where the change is not carried out at all, thereby offering the advantage of durability. On the other hand, when the change is not carried out at all, since all of the engine torque change values are uniformly set at 0 in the case were two or more ESA lines are in the failed state, it becomes easy to set (tune) the raised value of working oil pressure in the frictionally engaging devices accordingly.

In the control flow shown in FIG. 11, both the cases where two ESA lines are in the failed state and where three ESA lines are in the failed state are handled in the same manner. However, it is needless to say that these cases can be separately handled in order to carry out the control.

Furthermore, in the control flows shown in FIGS. 10 and 11, the change of the shift point and the command for increasing oil pressure of the frictionally engaging devices are carried out separately from each other, however, it is evident that both can be carried out together. In this case, the extent of change of the shift point and the degree of increase of the oil pressure may be controlled in accordance with the failed state of the ESA lines.

Another embodiment of the present invention will hereunder be shown. According to this embodiment, whether or not the engine torque control can be carried out is detected, and when it is detected that the engine torque control cannot be carried out, an engine torque control regulation signal is outputted. When the regulation signal is outputted, the shift point is changed. This change is carried out by correcting the measured value. Detailed description thereof will hereunder be given.

Figure 18:
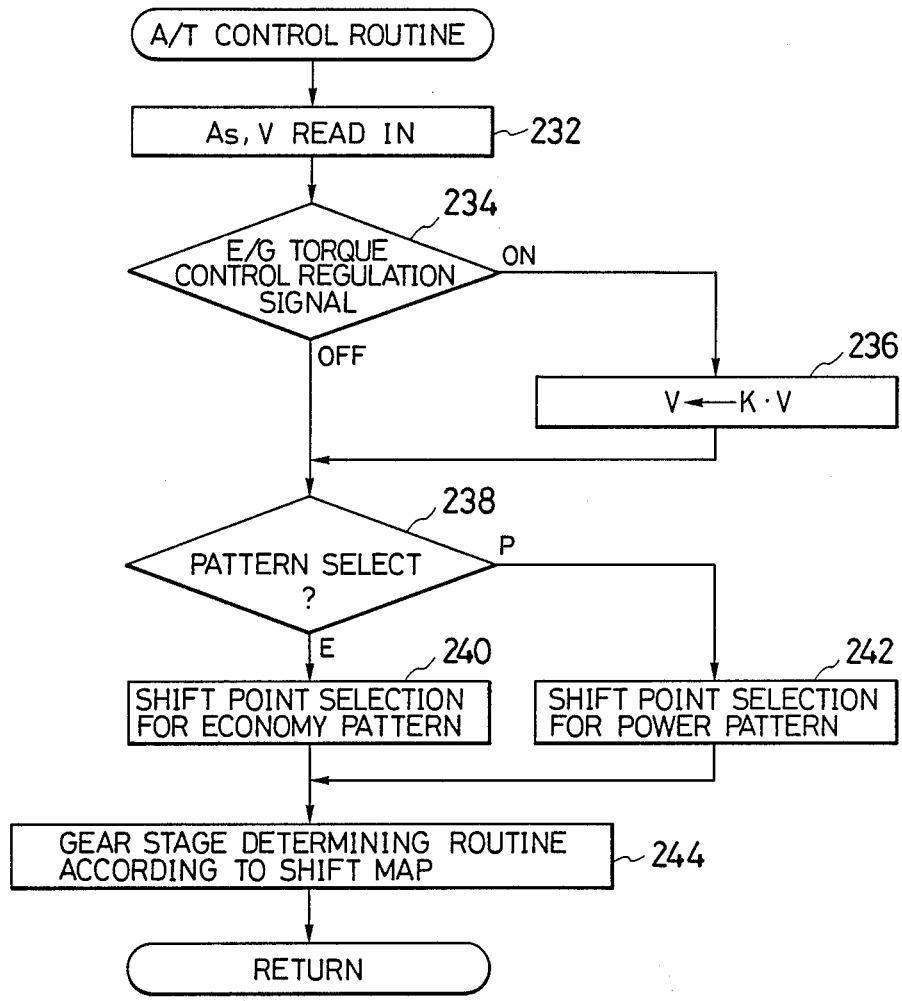
FIG. 18 is a flow chart showing another automatic transmission control routine.

FIG. 18 shows the ECT control routine. A throttle opening As is read in by a throttle sensor 12, and a vehicle speed V is read in by a vehicle speed sensor 13 (Step 732). Subsequently, whether the engine torque control cannot be carried out or not, i.e., the engine torque control regulation signal is ON or OFF is detected (Step 734). When the determination is OFF, i.e., the engine torque control is in the normal state, the routine proceeds to Step 738. However, when the determination is ON, i.e., the engine torque control is in the failed state, the measured vehicle speed V is changed. More specifically, the current actual value of the vehicle speed V is multiplied by a predetermined value K ($K>1$) to obtain a new vehicle speed V (Step 736). Thereafter, the state of a pattern select switch 17 is determined (Step 738), in the case of an economy pattern, a shift point map for an economy pattern is selected (Step 740), and in the case of a power pattern, a shift point map for a power pattern is selected (Step 742). A gear stage of the ECT is to be determined in accordance with the shift point map, changed vehicle speed V and throttle opening As (Step 744).

Incidentally, in this case, the predetermined value K may preferably be made variable in accordance with the state of the pattern select switch 17. More specifically, in the power pattern wherein the shift point is relatively high, the value of K is set high, while, in the economy pattern, the value K is set low, so that the shift point can be changed accurately.

Figure 19:
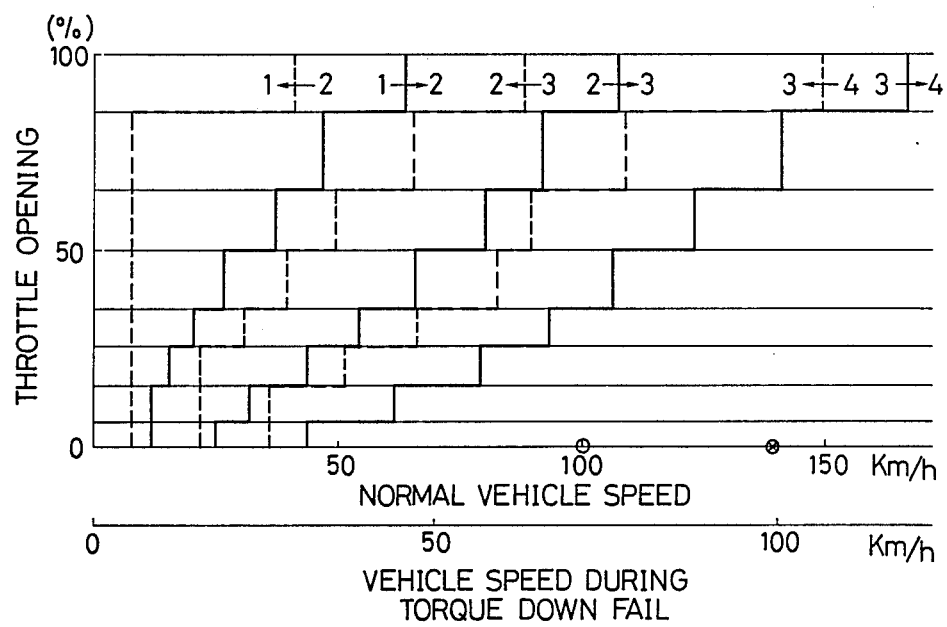
FIG. 19 is a chart showing an example of the shift point map in the above flow chart.

In this embodiment, when the engine torque control cannot be carried out for some reason or other (an unusual rise in exhaust gas temperature, ESA lines' trouble for example), the vehicle speed V is raised higher than the original value to lower the shift point of the ECT, whereby heat load of the frictionally engaging devices during shifting is decreased, so that the durability of the frictionally engaging devices can be secured and the shift characteristics can be maintained well. More specifically, FIG. 19 shows the shift point map of the ECT. When the torque down control cannot be carried out, the vehicle speed determined by the computer becomes high, so that the same effect as the shift point is relatively lowered can be obtained. When the torque down failure occurs during running of the vehicle at 100 Km/h for example, since $V'=100 \times K$, if $K=1.4$, then $V'=140$ Km/h is obtained. Though it is actually 100

Km/h, 140 Km/h is determined by the computer, whereby the shift point map is contracted to the lower speed by 1/K. As a consequence, a slightly low shift point can be set without changing the shift point map (or without requiring another shift map). As a result, in the case of the normal four gear stages ECT wherein a lockup clutch operates at 2nd gear stage or higher, 96 data are needed for one pattern in the shift point map, for example. Namely, twelve shift lines are provided including 1st to 2nd, 2nd to 3rd, 3rd to 4th, 4th to 3rd, 3rd to 2nd, 2nd to 1st, 2nd and L/C (lockup clutch) ON, 2nd and L/C OFF, 3rd and L/C ON, 3rd and L/C OFF, 4th and L/C ON, and 4th and L/C OFF. When throttle opening As is divided into eight steps, then 96 (12×8) data are needed. In contrast thereto, only one word of Step 236 makes it possible to change.

A further embodiment of the present invention will hereunder be described with reference to FIG. 20.

Figure 20:
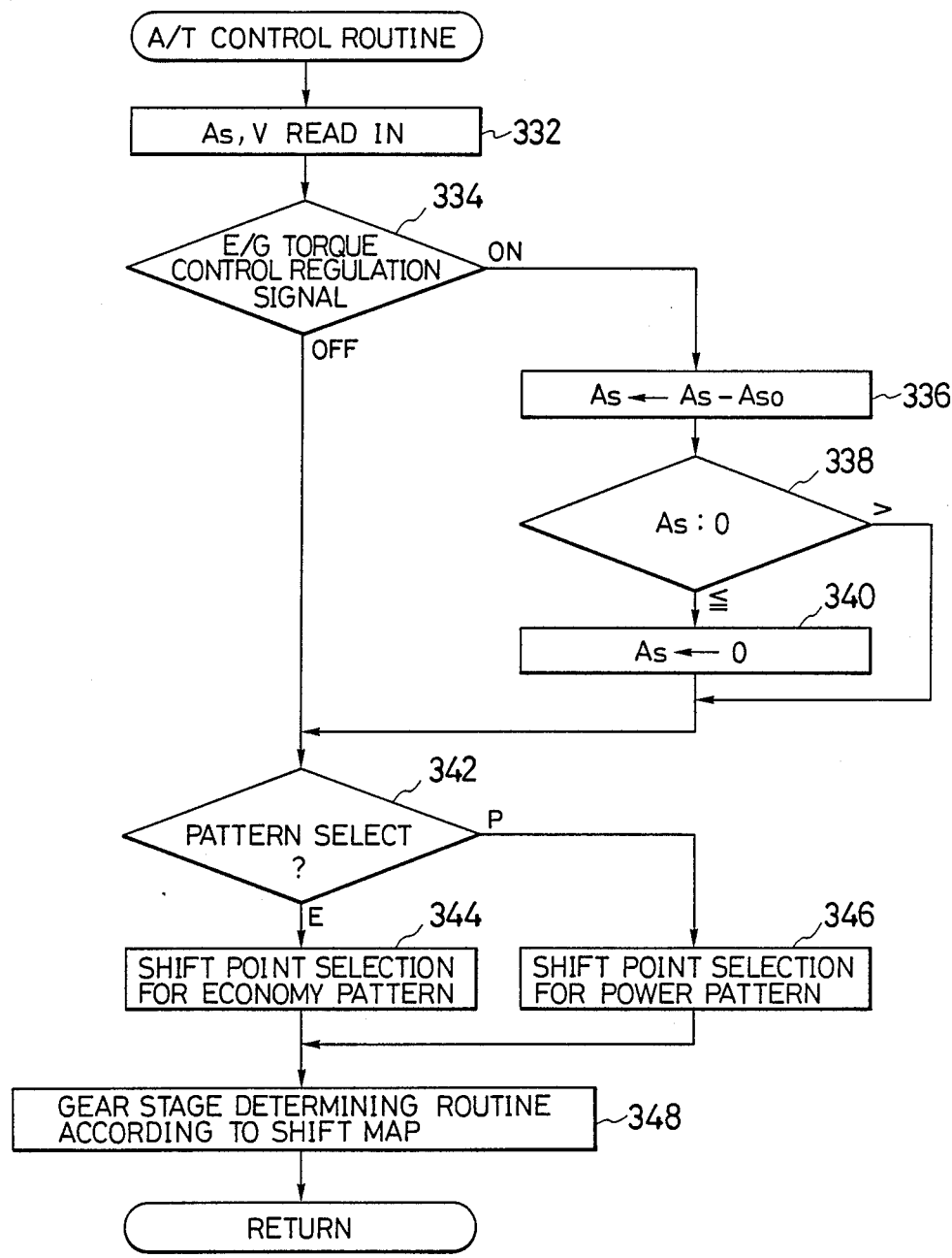
FIG. 20 is a flow chart showing an example of a further automatic transmission control routine.

FIG. 20 shows the ECT control routine as well. First, the throttle opening As is read in by the throttle sensor 12 and the vehicle speed V is read in by the vehicle speed sensor 13 (Step 832). Subsequently, whether the engine torque control cannot be carried out or not, i.e., the engine torque control regulation signal is ON or OFF is determined (Step 834). When the determination is OFF, i.e., the engine torque control is in normal state, the routine proceeds to Step 842, while, when the determination is ON, i.e., the engine torque control is in the failed state, the throttle opening As is changed. This change is performed such that a value obtained by subtracting a predetermined value As0 from the current actual throttle opening As is made to be a new As (Step 836). In Step 836, whether the value is less than 0 or not is determined. When As<0, As is set at 0 (Step 840), while, when As>0, nothing is one. In Step 842, the state of a pattern select switch 17 is detected. In the case of an economy pattern, a shift point map for an economy pattern is selected (Step 844), and, in the case of a power pattern, a shift point map for a power pattern is selected (Step 846). A gear stage of the ECT is to be determined in accordance with the shift point map, vehicle speed V and changed throttle opening As (Step 848).

Incidentally, in this case, the predetermined value As0 may preferably be made variable in accordance with the state of the pattern select switch 17. More specifically, in the power pattern wherein the shift point is relatively high, the value As0 is set high, while, in the economy pattern, the value As0 is set low, so that the shift point can be changed accurately.

Figure 21:
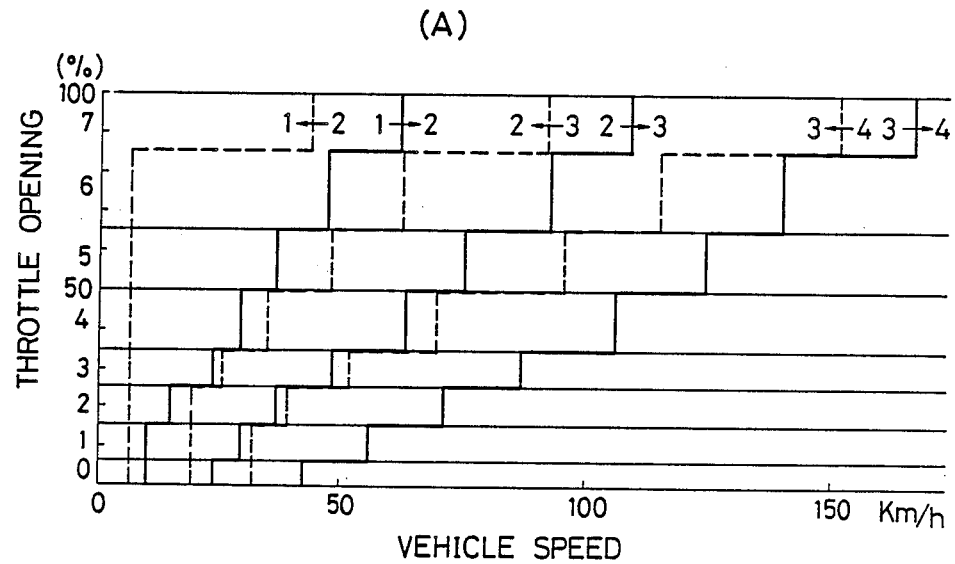
FIG. 21 is a chart showing an example of the shift point map in the above flow chart.

In this second embodiment, when the engine torque control cannot be carried out for some reason or other, the throttle opening is determined to be lower than the original value, so that the durability of the frictionally engaging devices can be secured and the shift characteristics can be maintained well. More specifically, FIG. 21 (A) shows the chart of shifting of the ECT, while, the throttle opening As is divided into 8 steps as shown in FIG. 21 (B). As a consequence, when the predetermined value As0 is set at 2 for example, even if As is set at 7, which is originally fully opened, it is determined that As'=7−2=5, whereby a shift point in the region of 50−65% is selected. As the result, a slightly low shift point can be attained without changing the shift point map (without requiring another shift point map) in the same manner as in the above embodiment.

What is claimed is:

1. A system for integrally controlling an automatic transmission and an engine, wherein engaged states of frictionally engaging devices are switched in accordance with a preset shift point so that gear stages can be automatically switched, and engine torque is changed during shifting to maintain satisfactory shift characteristics and durability of the frictionally engaging devices, said system comprising:
   communication means for carrying out said engine torque change;
   detecting means for detecting whether or not said communication means is in a failed state; and
   means for changing at least one shift parameter in said automatic transmission in a direction for securing durability of said frictionally engaging devices in accordance with detection by the detecting means of the failed states of said communication means.

2. The system as set forth in claim 1, wherein said shift parameter to be changed includes a shift point of said automatic transmission.

3. The system as set forth in claim 1, wherein said shift parameter to be changed includes engagement oil pressure of said frictionally engaging devices of the automatic transmission.

4. The system as set forth in claim 1, wherein said shift parameters to be changed include a shift point of said automatic transmission and engagement oil pressure of said frictionally engaging devices.

5. The system as set forth in claim 1, further comprising; means for detecting whether or not the failed state of said communication means is serious,
   wherein when the failed state of said communication means is detected to be not serious, a shift point of said automatic transmission is selected as said shift parameter to be charged, while, when the fail is detected to be serious, engagement oil pressure of said frictionally engaging devices is selected as said shift parameter to be changed.

6. The system as set forth in claim 2, further comprising:
   means for correcting at least one measured value of factors to determine said shift point,
   wherein change of said shift point of said automatic transmission is performed by correcting said measured value in direction changing said shift point substantially slightly low.

7. The system as set forth in claim 6, wherein said measured value of the factors for determining said shift point includes vehicle speed.

8. The system as set forth in claim 6, wherein said measured value of the factors for determining said shift point includes engine load.

9. The system as set forth in claim 6, further comprising;
   a pattern select switch for selecting running characteristics of a vehicle,
   wherein a correction value of said measured value is changed in accordance with a selected position of said pattern select switch.

10. The system for integrally controlling an automatic transmission and an engine, wherein gear stages can be automatically switched in accordance with a preset shift point and engine torque is changed during shifting to maintain the satisfactory shift characteristics, comprising:
    means for detecting whether or not said engine torque is in a state of being practically changeable; and means for correcting at least one measured value of the factors for determining said shift point in direction for lowering said shift point, when said engine torque is not changeable.

11. The system as set forth claim 10, wherein said measured value of the factors for determining shift point includes vehicle speed.

12. The system as set forth in claim 10, wherein said measured value of the factors for determining said shift point includes engine load.

13. The system as set forth in claim 10, further comprising;
   a pattern select switch for selecting running characteristics of a vehicle,
   wherein a correction value of said measured value is changed in accordance with a selected position of said pattern select switch.

14. The system as set forth in claim 10, further comprising:
   communication means for carrying out said engine torque change; and
   detecting means for detecting whether or not said communication is in a failed state;
   wherein, when said communication means are detected to be in the failed state, said detecting means detects that the engine torque change is in a state of being practically changeable.

* * * * *